(12) United States Patent
Nozato

(10) Patent No.: US 7,706,002 B2
(45) Date of Patent: Apr. 27, 2010

(54) METHOD AND SERVER FOR MANAGING PRINTER

(75) Inventor: Koji Nozato, Kyoto (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/030,825

(22) Filed: Feb. 13, 2008

(65) Prior Publication Data

US 2008/0137123 A1 Jun. 12, 2008

Related U.S. Application Data

(63) Continuation of application No. 10/717,451, filed on Nov. 21, 2003, now Pat. No. 7,349,110.

(51) Int. Cl.
*G03G 15/00* (2006.01)
*G06F 3/12* (2006.01)
(52) U.S. Cl. .................. 358/1.13; 358/450; 399/82; 399/85; 399/364
(58) Field of Classification Search .............. 358/82, 358/85, 364, 1.13, 1.15, 450
See application file for complete search history.

(56) References Cited

U.S. PATENT DOCUMENTS

| 6,151,464 | A  | * | 11/2000 | Nakamura et al. ............. 399/79 |
| 6,188,490 | B1 |   | 2/2001  | Miyake |
| 6,337,744 | B1 |   | 1/2002  | Kuroda |
| 6,714,316 | B1 |   | 3/2004  | Nishiyama |
| 6,728,499 | B2 |   | 4/2004  | Ushio et al. |
| 6,999,198 | B1 |   | 2/2006  | Nakagiri et al. |
| 7,039,199 | B2 | * | 5/2006  | Rui .............................. 381/92 |
| 7,151,610 | B2 |   | 12/2006 | Nagaso |
| 2001/0054152 | A1 | * | 12/2001 | Nakao et al. ................ 713/182 |

FOREIGN PATENT DOCUMENTS

| JP | 11-34410 | 2/1999 |
| JP | 11-110156 | 4/1999 |
| JP | 2001-282475 | 10/2001 |
| JP | 2002-304092 | 10/2002 |

OTHER PUBLICATIONS

Machine Translated JP2002-304092A.*
Office Action, dated Jun. 9, 2008, in JP 2002-344576.

* cited by examiner

*Primary Examiner*—Chan S Park
(74) *Attorney, Agent, or Firm*—Fitzpatrick, Cella, Harper & Scinto

(57) ABSTRACT

The present invention realizes resource saving and energy saving by grasping and managing a usage efficiency of an image forming apparatus. To accomplish this, a method in accordance with the present invention is an information processing method of managing usage information on a job which is issued from an information processing apparatus to an image forming apparatus, which includes: a step of acquiring the usage information from the information processing apparatus or the image forming apparatus; a step of deriving the number of logical pages and the number of physical sheets from the usage information acquired in the acquisition step; and a step of outputting usage efficiency information of the image forming apparatus using the number of logical pages and the number of physical sheets derived in the derivation step.

5 Claims, 13 Drawing Sheets

METHOD AND SERVER FOR MANAGING PRINTER

This application is a continuation application of application Ser. No. 10/717,451, now allowed, filed Nov. 21, 2003, which is incorporated herein by reference.

FIELD OF THE INVENTION

The present invention relates to a technique for managing use of an image forming apparatus.

BACKGROUND OF THE INVENTION

Conventionally, there have been known systems for managing use of an image forming apparatus (see Japanese Patent Laid-Open No. 11-110156). Basically, the image forming apparatus is used freely at users discretion. As concerns to environmental problems increase recently, it is required to enhance efficient use of the image forming apparatus and to reduce consumption of resources and energy.

However, an administrator has no data for determining how efficient a user uses the image forming apparatus. Thus, the administrator cannot perform in-depth management of use of the image forming apparatus from the point of view of resource saving and energy saving.

SUMMARY OF THE INVENTION

Accordingly, an aspect of the present invention is to manage a efficient of usage of image processing apparatus.

According to the present invention the foregoing aspect is attained by providing an information processing method of managing usage of information on a job issued to an image forming apparatus from an information processing apparatus, the information processing method comprising:

a step of acquiring the usage information from the information processing apparatus and the image forming apparatus;

a step of deriving the number of logical pages and the number of physical pages from the usage information acquired in the acquisition step; and a step of outputting information on usage efficiency of the image forming apparatus using the number of logical pages and the number of physical pages derived in the deriving step.

Other features and advantages of the present invention will be apparent from the following description taken in conjunction with the accompanying drawings, in which like reference characters designate the same or similar parts throughout the figures there.

DETAILED DESCRIPTION OF THE PREFERRED EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Note that job information in this specification refers to information on a job issued to an information forming apparatus such as a printer from a computer. Print information refers to information on a result of printing in the image forming apparatus such as a printer. Plural pieces of print information arranged in a form of a history are referred to as a print history. In addition, usage information refers to information indicating how the image forming apparatus is used. Basically one piece of usage information is obtained for one job. In the case in which the print information cannot be acquired from the image forming apparatus, only the job information is included in the usage information. In the case in which the job information cannot be acquired from the computer, only the print information is included in the usage information. In addition, in the case in which the job information from the computer and the print information from the image forming apparatus can be acquired for one job, the job information and the print information are combined to form the usage information. Further, a usage history is a history of the usage information and includes plural pieces of usage information.

<Job Account System>

Figure 1:
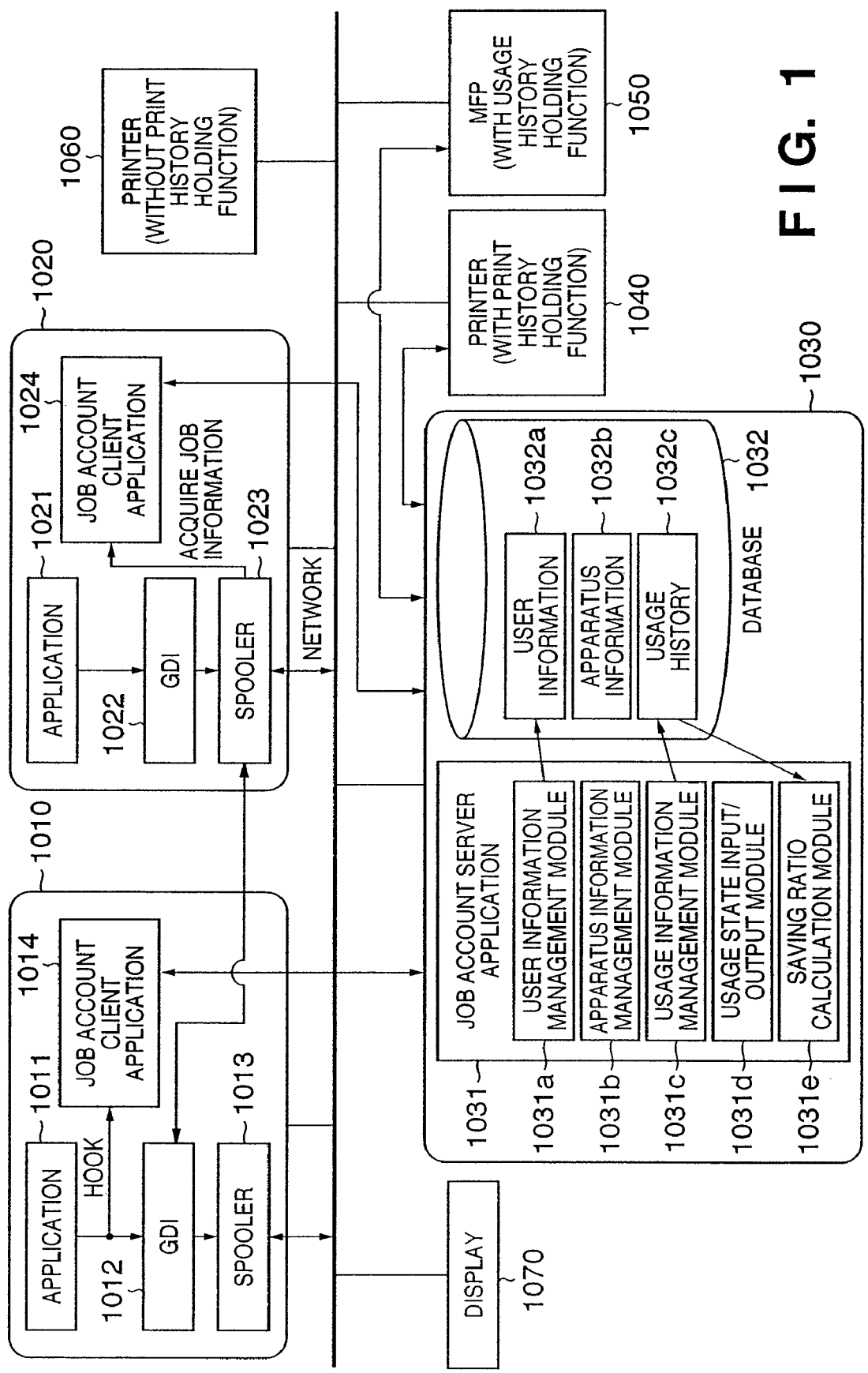
FIG. 1 is a block diagram showing a structure of a job account system in accordance with an embodiment of the present invention.

FIG. 1 is a basic diagram of an entire job account system shown as this embodiment. Reference numerals 1010 and 1020 denote client computers. Reference numeral 1030 denotes a server computer serving as an information processing apparatus.

Reference numerals 1040 and 1060 denote printers shown as an example of the image forming apparatus. Note that the printer 1040 includes a function of holding a print history (print history holding function), and the printer 1060 does not include the print history holding function. Reference numeral 1050 denotes an MFP (Multi Function Printer). The MFP 1050 is provided with a printer function, a copy function, a scanner function, and the print history holding function.

The computers 1010, 1020, and 1030 and the printers 1040, 1050, and 1060 can communicate with other apparatuses via a network.

(Software Configuration of the Client Computers)

The client computers 1010 and 1020 include applications 1011 and 1021, which edit a document, an image, or the like and issue a print request, GDIs (Graphics Device Interfaces)

1012 and 1022, which receive the print request from the applications 1011 and 1021 and output print data to a printer, and spoolers 1013 and 1023. In addition, the client computers 1010 and 1020 include job account client applications 1014 and 1024, which hook a Windows (registered trademark)—GDI function in the case of requesting printing from the applications 1011 and 1021 to acquire job information.

The job information includes the number of sheets to be printer, the number of pages, a size of printing, a type of a sheet to be used, information on a user who has issued a print request, color print information, a page layout (Number up), and information on double sides or one side. However, not all of these pieces of information are always included, and only the number of pages is included depending upon an environment or an apparatus.

The information such as the number of pages and the number of sheets included in the job information, which can be acquired by the client computers 1010 and 1020 are those requested from the applications 1011 and 1021. Thus, if a page layout function or a double side recording function is used, the number of pages and the number of sheets may be different from the number of pages and the number of sheets of a recording material which is actually outputted. Therefore, here, the number of pages and the number of sheets included in the job information are referred to as the number of logical pages and the number of logical sheets, which are distinguished from the number of physical pages and the number of physical sheets in the recording material which is actually outputted.

When the application 1011 calls the GDI 1012 in the client computer 1010, the GDI 1012 generates print data in response to an instruction from the application 1011 and sends the print data to the spooler 1013. The job account client application 1014 watches (hooks) the application 1011 calling the GDI 1012 and accumulates job information for the print data.

The spooler 1013 communicates with the printer 1040, the MFP 1050, and the printer 1060 via a network and, if these apparatuses are in a ready state, sends print data to the apparatuses.

The job account client application 1014 periodically sends the accumulated job information to the job account server application 1031.

In the client computer 1020, the application 1021, the GDI 1022, and the spooler 1023 operate in the same manner as the application 1010, the GDI 1012, and the spooler 1013, respectively.

The job account client application 1024 periodically watches the spooler 1023. If there is a print job spooled by the spooler 1023, the job account client application 1024 uses an API (Application Program Interface) to acquire job information. More specifically, the job account client application 1024 acquires the number of discharged sheets and the number of pages of the print job. Then, the job account client application 1024 sends the accumulated job information to the job account server application 1031.

If an OS includes a function of communicating a change in a state to other applications, the job account client application 1024 does not have to periodically watch the spooler 1023. It is sufficient that the OS informs the job account client application 1024 that a print job is spooled by the spooler 1023.

(Software Configuration of the Server Computer)

On the other hand, the server computer 1030 includes a database 1032 for storing user information 1032a, apparatus information 1032b, and usage history information 1032c. The user information 1032a includes a computer login name and a network login name of a user using an apparatus and provides information specifying a user who used the apparatus. The apparatus information 1032b includes a print speed, color information, and a network address of an apparatus.

In addition, the server computer 1030 includes a user information management module 1031a, an apparatus information management module 1031b, an usage information management module 1031c, a usage state input/output module 1031d, and a saving ratio calculation module 1031e.

The user information management module 1031a stores the user information 1032a in the database 1032 in the server computer 1030 and manages the same.

In addition, the apparatus information management module 1031b checks whether or not a printer connected to a network has the print history holding function. Then, the apparatus information management module 1031b stores information on an apparatus, which has the print history holding function, and other apparatus information in the database 1032 in the server computer 1030 as the apparatus information 1032b and manages the same.

The user information management module 1031c receives job information from the job account client applications 1014 and 1024 and stores the job information in the database 1032 as the usage history information 1032c.

Further, the usage information management module 1031c requests usage history information from the printer 1040, the MFP 1050, or the like having a function of holding usage history information therein, acquires the usage history information via the usage state input/output module 1031d, and adds the usage history information to the usage history information 1032c existing in the database 1032. This processing may be periodically performed, or may be performed from the apparatus side at the point when a capacity of an area storing the usage history information in the printer 1040 or the MFP 1050 has decreased. Usage information included in the usage history information held in the apparatus is essentially of the same nature as the job information and includes the number of sheets to be printed, the number of pages, a size of printing, a type of a sheet to be used, information on a user who has issued a print request, color print information, a page layout (Number up), and information on double-sided printing or one-side printing. However, only the number of pages may be held as the usage information depending upon an environment or an apparatus.

The usage information held in an apparatus includes the number of physical pages and sheets which the apparatus has actually outputted.

The usage state input/output module 1031d acquires usage history information from an image forming apparatus having the usage history holding function. In addition, the usage state input/output module 1031d can also output a usage state report (a report indicating which user has executed how many jobs, etc.) to a printer or a monitor.

Therefore, an administrator can cause the usage state input/output module 1031d to output a usage state and obtain the usage state of the image forming apparatus. The usage state input/output module 1031d outputs various usage states on the basis of the user information, the apparatus information, and the usage history information stored in the database 1032. The administrator designates an output form of the usage states which the usage state input/output module 1031d adopts. Note that the output of the usage states is displayed on a display (not shown) of the server computer 1030. In addition, usage state data may be sent to the client computer 1010 or 1020 to display an output of the usage state on a display (not shown) of the client computer.

As a usage state report, a usage amount for each user (the number of sheets and an amount of toner used for an output)

and a usage time of the image forming apparatus can be outputted. In addition, it is also possible to output a usage state for each operation mode (function) of the image forming apparatus such as color print or double-sided printing. Further, it is also possible to output a usage state for each size of a sheet used for printing or a type of the sheet.

In addition, in the case in which a usage fee of a printer is set in the apparatus information, the fee is outputted for each printer or each user. Moreover, since a usage fee for each operation mode, a usage fee for each sheet size, and a usage fee for each type of a sheet are set, a user who performed printing, a sheet on which the printing was applied, an operation mode in which the printing was performed, an amount of printing, and an usage amount of the printer can be outputted. Note that, usually, an object of charging is the number of physical pages (so-called number of faces of sheets).

Further, the saving ratio calculation module $1031e$ calculates a saving ratio as a kind of usage efficiency information on the basis of the usage history information $1032c$ and passes the saving ratio to the usage state input/output module $1031d$ to output it to a display apparatus in the outside. There are two kinds of saving ratios, namely, a page saving ratio and a number of sheets saving ratio. The page saving ratio is a saving ratio of physical pages with respect to logical pages. In the case in which a job is issued for document data with twelve logical pages, 2-up setting for printing two logical pages for one physical page is performed. Further, in the case in which double-sided printing is set, the number of logical pages is twelve, the number of physical pages is six, and the number of physical sheets is three. Therefore, the page saving ratio is calculated as $(12-6)/12=½$, and the number of sheets saving ratio is calculated as $(12-3)/12=¾$. The number of sheets saving ratio represents saving of recording sheets, and the page saving ratio represents saving of charge or a recording agent (toner or ink). Therefore, in this example, it can be indicated on a monitor or the like of the server computer $1030$ that "the number of outputted sheets could be saved by ¾, and charge could be saved by ½".

Note that the saving ratio calculation module $1031e$ can automatically switch a calculation method of the saving ratio according to usage information to be an object of calculation.

Note that, although a display screen showing the saving ratio can be displayed after calculating the saving ratio in the saving ratio calculation module $1031e$, it is also possible to calculate the page saving ratio and the number of sheets saving ratio on the basis of the number of logical pages, the number of physical pages, and the number of physical sheets, which are calculated job information acquired from various routes.

For example, a case in which a user 1, a user 2, and a user 3 are registered in a job account system will be considered. In this case, for example, it is assumed that the user has outputted 1000 logical pages, 500 physical pages, and 300 physical sheets. Based upon the above-described calculation method, the saving ratio calculation module $1031e$ calculates the page saving ratio for the user 1 as 50% and the number of sheets saving ratio for the user 1 as 70%. In the case in which the user 2 has outputted 2000 logical pages, 400 physical pages, and 200 physical sheets, the saving ratio calculation module $1031e$ calculates the page saving ratio as 80% and the number of sheets saving ratio as 90%. In the case in which the user 3 has outputted 500 logical pages, 300 physical pages, and 250 physical sheets, the saving ratio calculation module $1031e$ calculates the page saving ratio as 40% and the number of sheets saving ratio as 50%. The usage state input/output module $1031d$ receives a list, in which user names of the user 1, the user 2, and the user 3, the number of logical pages, the number of physical pages, the number of physical sheets, and the number of sheets saving ratio of the respective users are associated with each other, from the saving ratio calculation module $1031e$. Moreover, the usage state input/output module $1031d$ can also be constituted so as to control processing for displaying the list in a table format on the job account server. In this case, the display processing may be controlled such that a user name of a user, whose usage efficiency including the number of sheets saving ratio and the page saving ratio is equal to or lower than that set in advance, is displayed in an identifiable manner.

<Control Configuration of a Computer>

Figure 2:
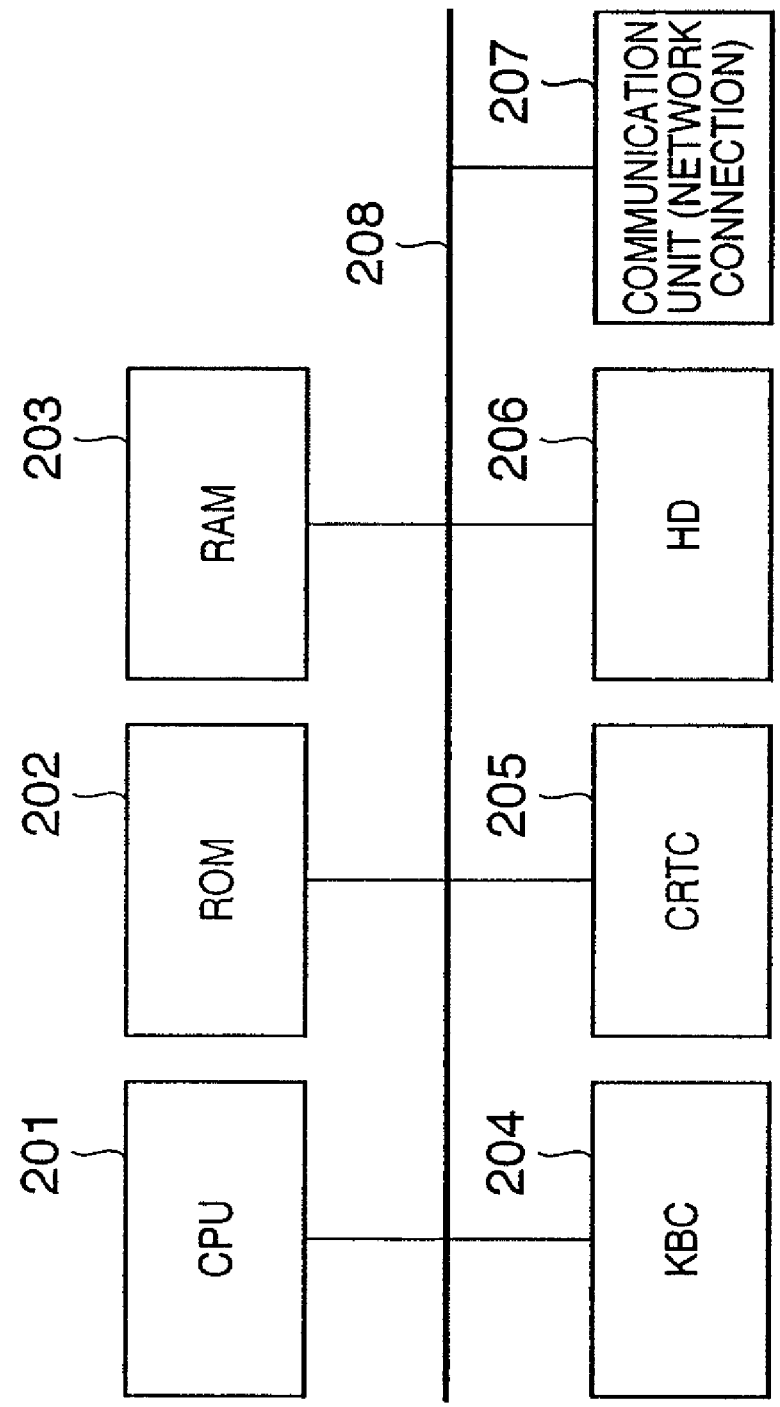
FIG. 2 is a block diagram showing a hardware configuration of a computer constituting the job account system.

FIG. 2 is a diagram showing a hardware configuration of the client computer 1010, the client computer 1020, and the server computer 1030.

Reference numeral 201 denotes a CPU (central processing unit). The CPU 201 performs control and arithmetic processing of the entire computer apparatus.

Reference numeral 202 denotes a ROM (read only memory). The ROM 202 is a storage area having stored therein information on a system startup program or the like. Reference numeral 203 denotes a RAM (random access memory). The RAM 203 is a storage area without limitation of use. An operating system (OS), an application program, a device driver (printer driver), a program for communication control, and the like are loaded to the RAM 203 and executed by the CPU 201.

Reference numeral 204 denotes a KBC (keyboard controller). The KBC 204 receives input data from a keyboard (not shown) attached to the computer and communicates the input data to the CPU 201. Reference numeral 205 denotes a CRTC (display controller). The CRTC 205 applies display control to a not-shown display. Reference numeral 206 denotes a HD (hard disk). Note that the HD 206 can be replaced by or used with an external storage device such as a FD (floppy (registered trademark) disk), an SRAM (nonvolatile memory), or the like. The HD 206 stores a program and data, which are loaded to the RAM 203 as required. For example, in the case of the HD in the server computer 1030, user information, apparatus information, and usage history information are stored therein.

Reference numeral 207 denotes a communication unit, which controls network communication. With this communication unit 207, the computer is capable of communicating with other computers and image forming apparatuses connected to the network.

Reference numeral 208 denotes a system bus. Data exchanges among the above-described components pass through this system bus 208.

<Memory Map>

Figure 3:
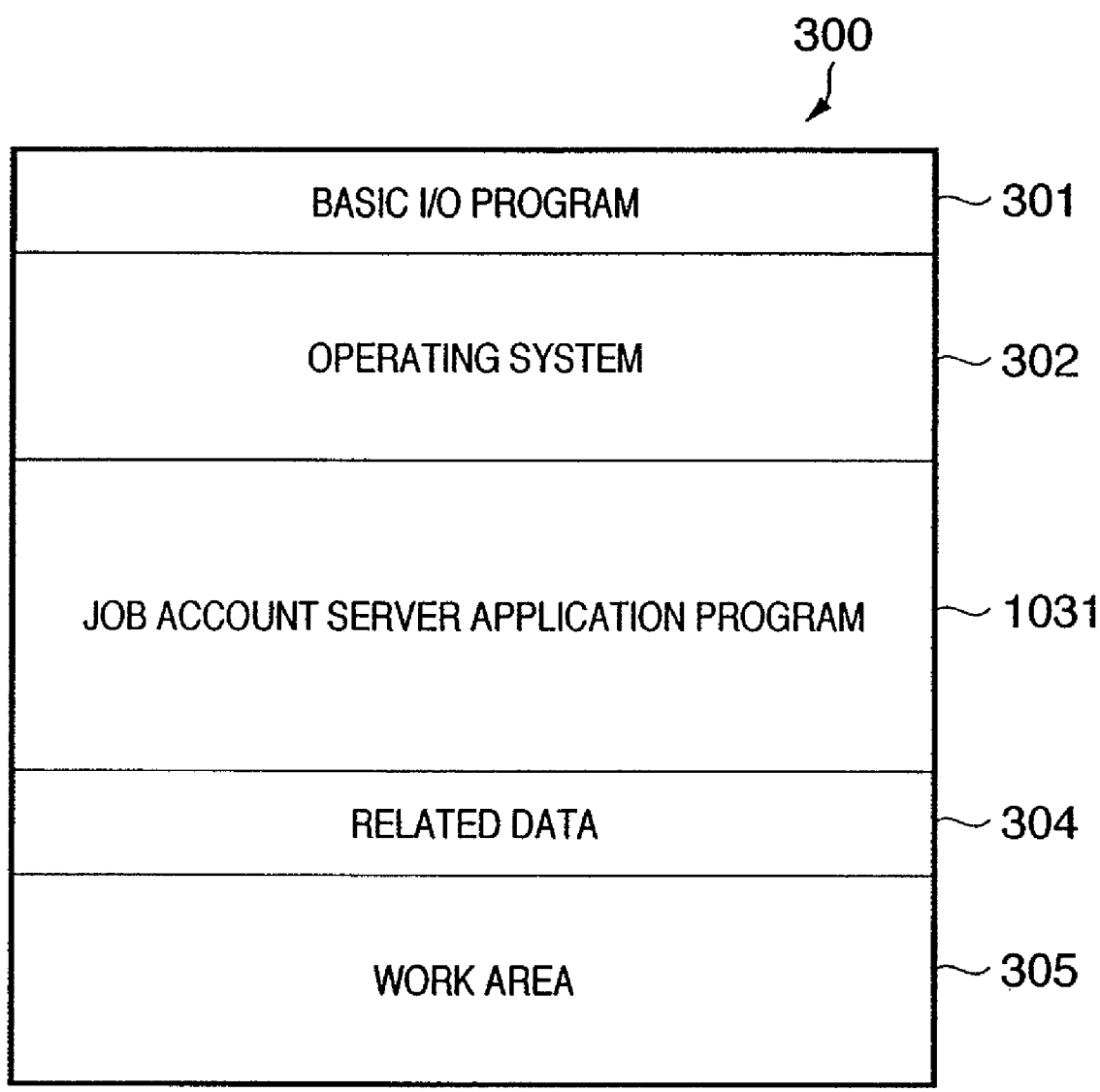
FIG. 3 is a diagram showing a memory map of a RAM of the computer constituting the job account system.

FIG. 3 is a diagram showing a memory map in a state in which a job account server application is loaded to the RAM 203 and is executable by the CPU 201. Reference numeral 301 denotes a basic I/O program. Reference numeral 302 denotes an operating system such as a Windows system. Reference numeral 304 denotes a related data of the job account server application 1031. Reference numeral 305 denotes a work area which the CPU 201 uses when it executes various programs.

The server computer 1030 operates as the basic I/O program 301, the operating system 302, and the job account server application 1031 are executed. The basic I/O program 301 is stored in the ROM 202 of FIG. 2. The operating system 302 and the job account server application 1031 are stored in the HD 206. When a power supply of the apparatus is applied, the operating system 302 and the job account server application 1031 are read in the RAM 203 from the HD 206 according to an IPL (initialize program loading) function in the basis I/O program 301 and started to operate.

Figure 4:
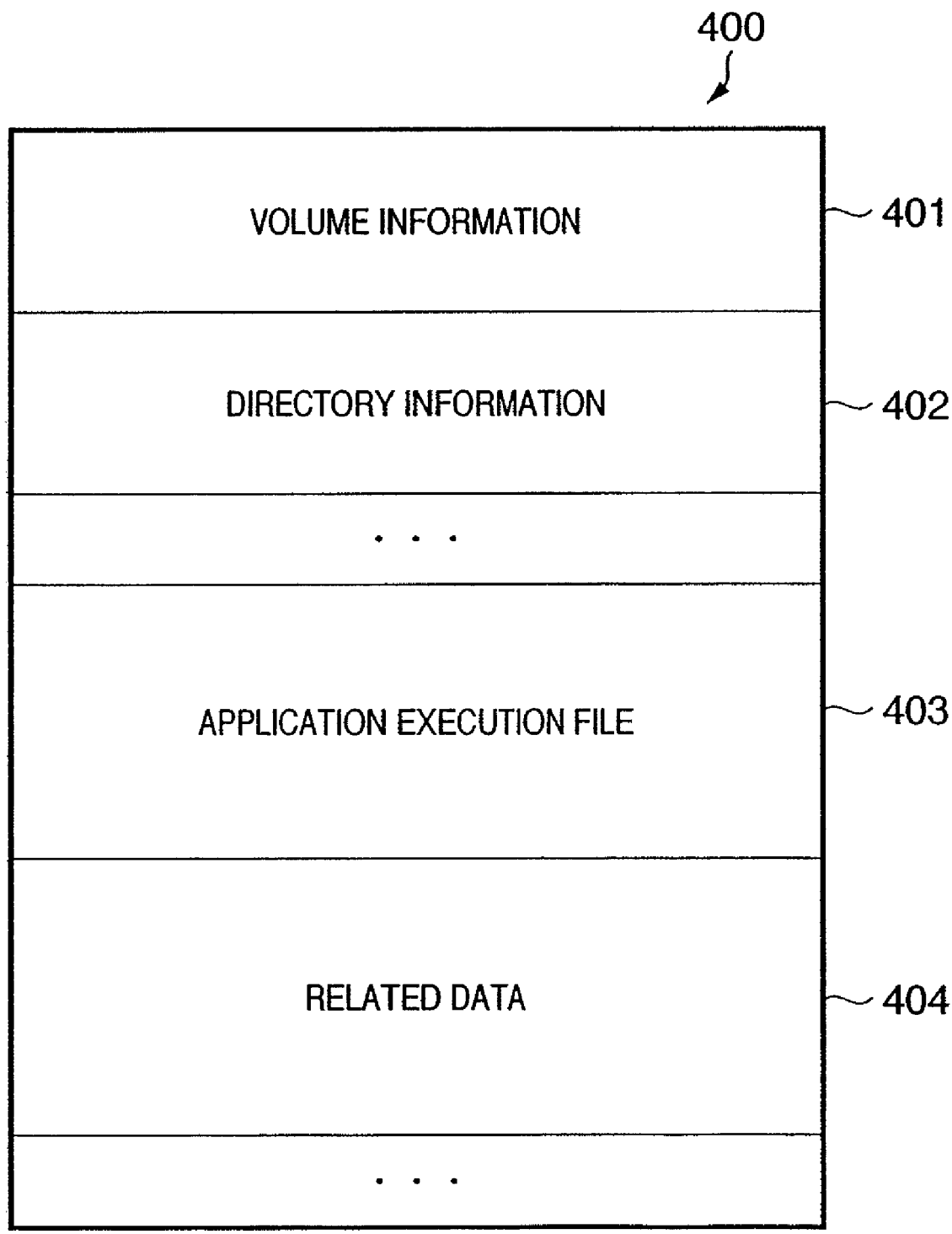
FIG. 4 is a diagram showing a memory map of a storage medium for realizing the job account system.

Note that the job account server application 1031 and the related data 304 are stored in a flexible disk (FD) or a CD-ROM and supplied to the computer from the same. FIG. 4 is a diagram showing a memory map in a state in which a job account server application and related data are stored in an FD or a CD-ROM. A storage area 400 of the FD or the CD-ROM includes volume information 401, directory information 402, an execution file 403 of the job account server application, and a related data file 404 of a job account.

Figure 5:
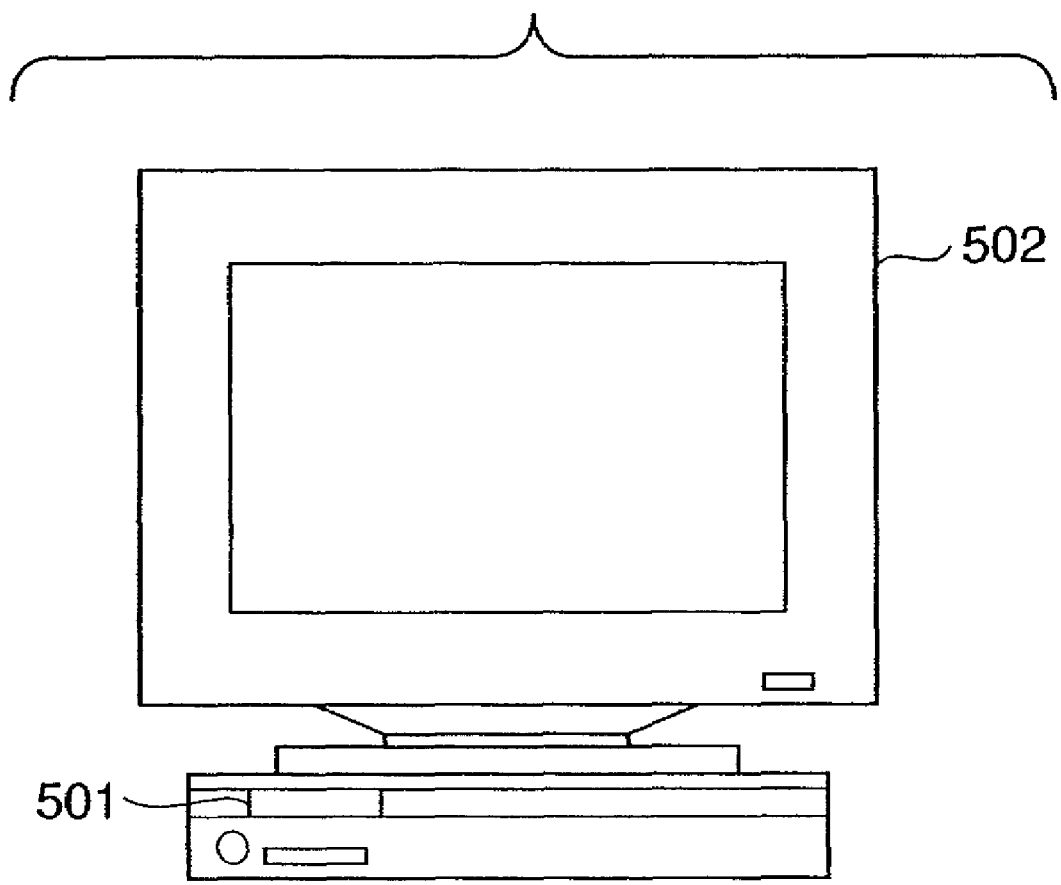
FIG. 5 is a diagram showing load from the storage medium of the job account system.

That is, the server computer 1030 is constituted by supplying a storage medium 500 such as an FD or a CD-ROM provided with the memory map shown in FIG. 4 to a disk driver 501 of a computer 502 as shown in FIG. 5 and installing a job account server application stored in the storage medium 500 in the HD 206 of the computer. Then, various effects are realized by the CPU 201 reading out and execute a program code stored in the HD 206. In this case, the program code itself read out from the storage medium 500 realizes the function of the embodiment, and the storage medium 500 having the program code stored therein constitutes the present invention.

As a storage medium for supplying a program code, an optical disk, a magneto-optical disk, a CD-R, a magnetic tape, a nonvolatile memory card, ROM car, HD card, and the like can be used other than the CD-ROM and the flexible disk. In addition, the function of the embodiment is not only realized by the computer reading out the read out program. It is needless to mention that the OS (operating system) or the like running on the computer performs a part or all of actual processing on the basis of an instruction of the program code, and the function of the embodiment is also realized by the processing. Moreover, it is needless to mention that, after the program code read out from the storage medium is written in a memory provided in a function extended board inserted in the computer or a function extended unit connected to the computer, a CPU provided in the function extended board or the function extended unit performs a part or all of actual processing on the basis of an instruction of the program code, and the function of the embodiment is realized by the processing.

<Hardware Configuration of the Image Forming Apparatus>

Figure 6:
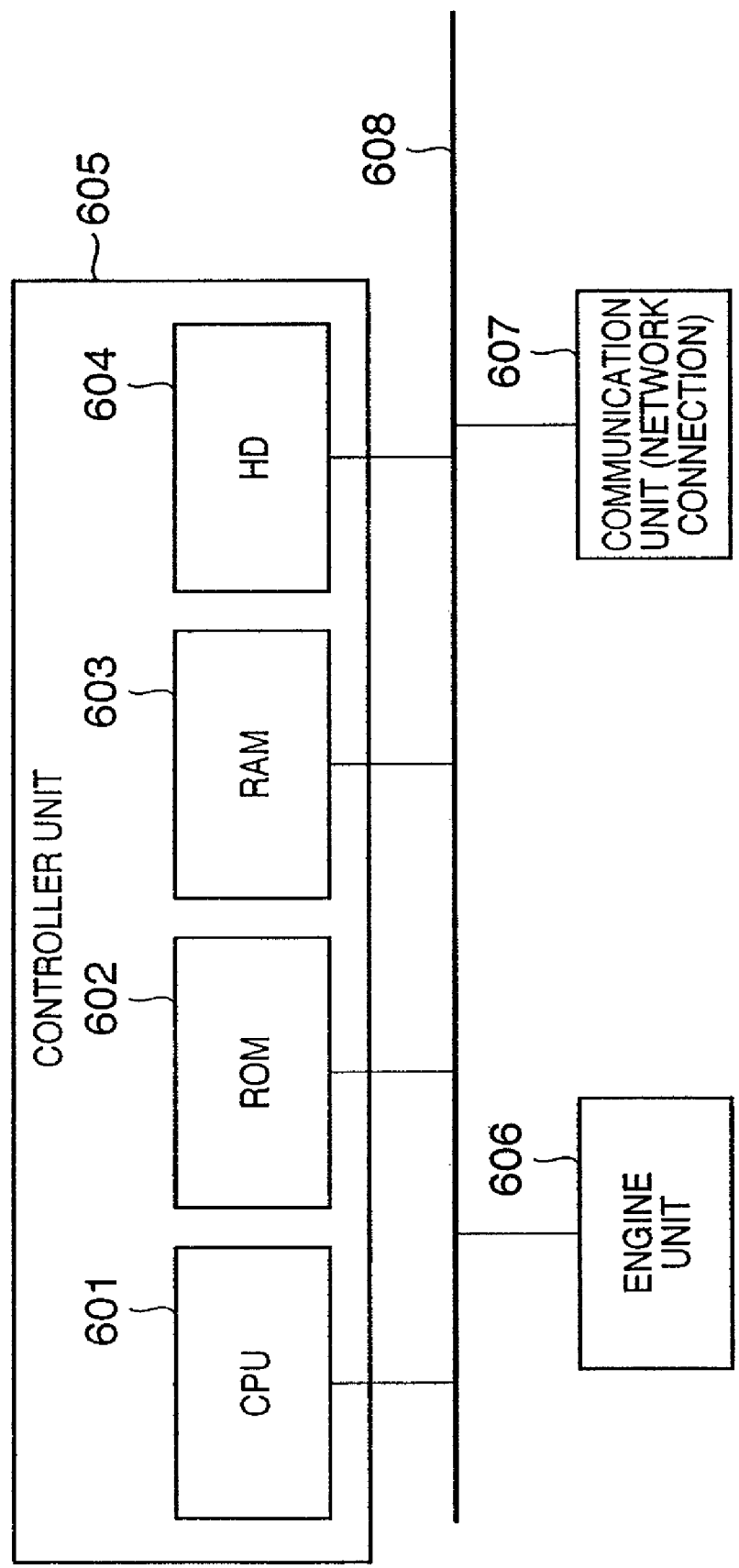
FIG. 6 is a block diagram showing a hardware configuration of an image forming apparatus constituting the job account system.

FIG. 6 is a diagram showing a schematic structure of the image forming apparatus. Reference numeral 605 denotes a controller unit for controlling the entire image forming apparatus. The controller unit 605 includes a CPU 601, a ROM 602, a RAM 603, and a HD 604.

The CPU 601 performs control and arithmetic processing of the controller unit and the entire image forming apparatus. The ROM 602 is a read only memory, which is a storage area for storing a system startup program or the like. The RAM 603 is a random access memory, which is a data storage area. The HD 604 is a hard disk, which can be replaced by or used with another nonvolatile storage device such as an SRAM. The image forming apparatus having the job history holding function stores a job history in the RAM 603 or the HD 604. In addition, an operating system, a program for communication control, and a program for engine control are loaded to the RAM 603 and executed by the CPU 601.

Reference numeral 606 denotes an engine unit of the image forming apparatus, which performs a print operation and an image reading operation under the control of the controller unit 605. The engine unit 606 includes a printer engine or a scanner engine, or both of the engines.

Reference numeral 607 denotes a communication unit, which controls network communication. With this communication unit 607, the image forming apparatus is capable of communicating with the client computer and the server computer. Reference numeral 608 denotes a system bus. Data exchanged among the above-described components passes through the system bus 608.

<Operation of the Client Computer>

Figure 7:
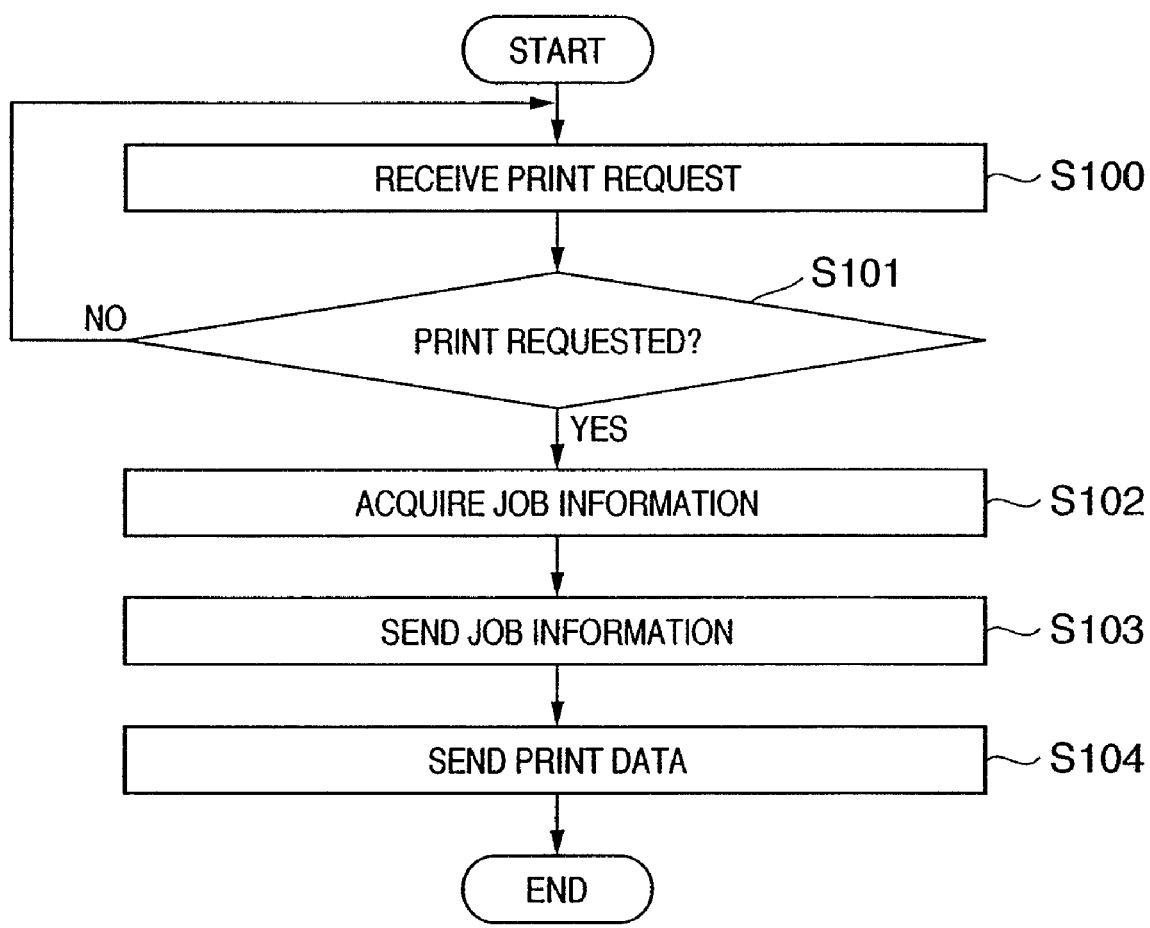
FIG. 7 is a flowchart showing processing for acquiring print information of the job account system.

An operation of the client computer 1010 of this embodiment will be described with reference to a flowchart of FIG. 7. This flowchart shows the case of print output.

First, the client computer 1010 performs print designation of a document which a user desires to print. The print designation means designation of an output printer and designation of an output range, the number of output copies, and the like. After the print designation, the client computer 1010 executes actual printing (step S100). The client computer 1010 judges appropriateness of a print request on the basis of contents of the print designation in step S100 (S101).

In step S102, in order to perform appropriate print management, the client computer 1010 acquires the number of sheets to be printed, a page layout, information on double sides, and user information as job information.

In step S103, the client computer 1010 sends the job information acquired in step S102 to the server computer. Thereafter, if the user does not cancel the print processing, the client computer 1010 proceeds to step S104 and actually sends a print request to the apparatus.

<Usage History Acquisition Operation of the Server Computer>

A usage history acquisition operation to be performed by the usage information management module 1031c of the server computer 1030 of this embodiment will be described with reference to flowcharts of FIGS. 8 and 9.

Figure 8:
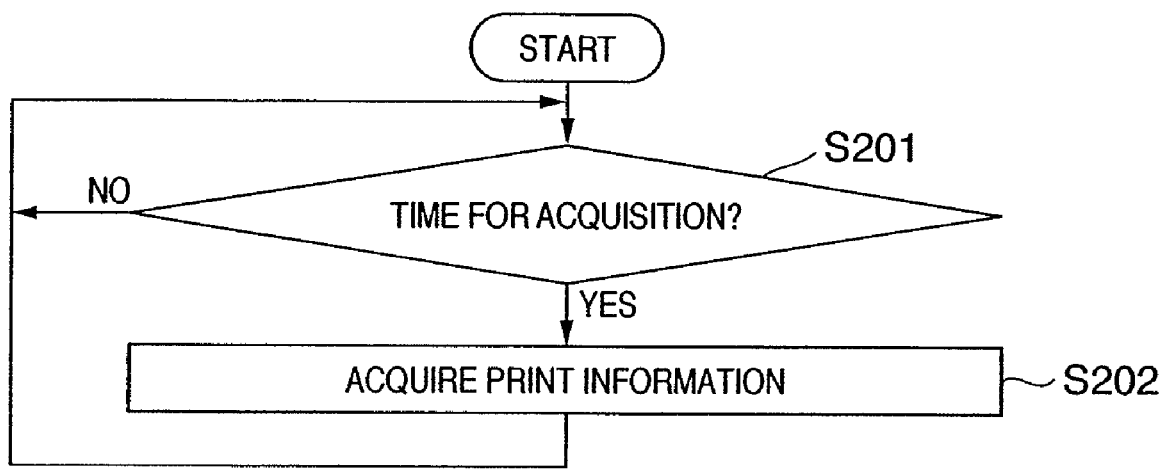
FIG. 8 is a flowchart showing processing for acquiring history in an apparatus of the job account system.

FIG. 8 is a flowchart showing processing in the case in which the server computer 1030 acquires a usage history automatically.

The usage information management module 1031c performs processing for print history information acquisition from the apparatus such as the printer 1040 or the printer 1050 for each designated period. That is, in step S201, the usage information management module 1031c confirms whether or not it is time for executing the processing for print history information acquisition. If it is the time for acquisition, in step S202, the usage information management module 1031c collects print history information from the apparatus and registers the information in the database 1032 as the usage history information 1032c.

Figure 9:
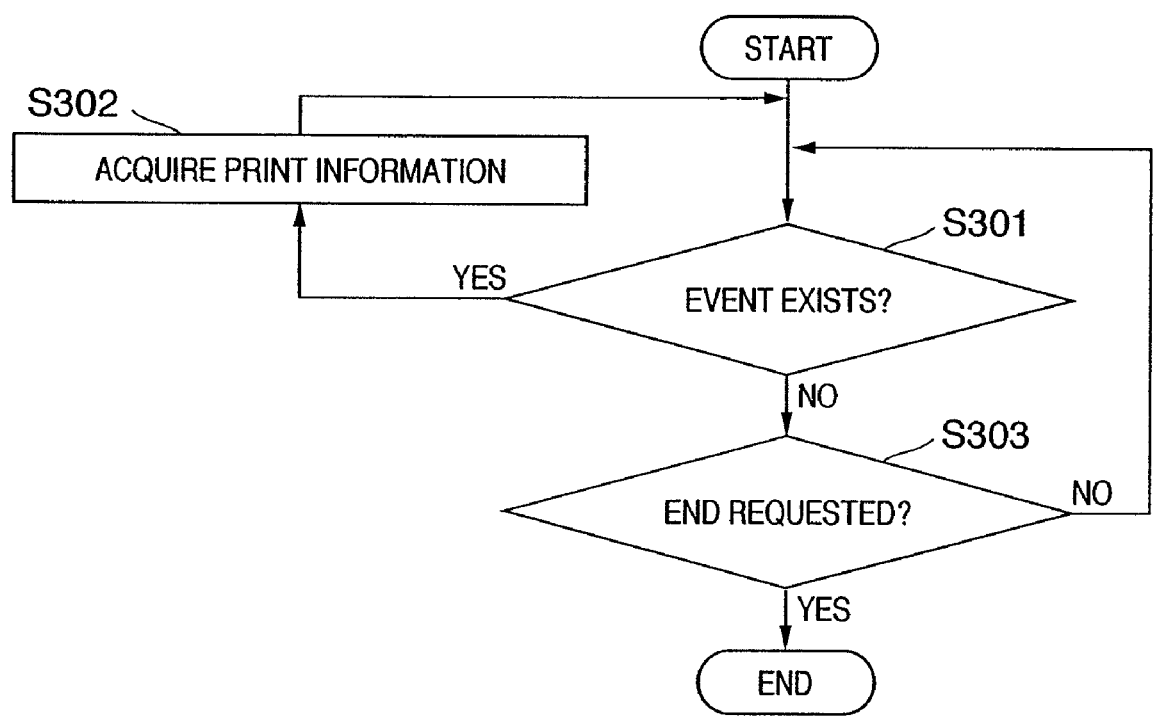
FIG. 9 is a flowchart showing processing for acquiring history in an apparatus of the job account system.

FIG. 9 is a flowchart showing processing in the case in which the server computer 1030 acquires a print history in response to an instruction of the apparatus.

In step S301, the server computer 1030 confirms whether or not an event of print history information acquisition is generated by the apparatus. If the event has been generated, the server computer 1030 acquires print information in step S302 and registers the print information in the database 1032 as the usage history information 1032c. If the event has not been generated, in step S303, the server computer 1030 confirms whether or not an end request has been received. If the end request has been received, the server computer 1030 ends the processing. If the end request has not been received, the server computer 1030 returns to step S301 and repeats the processing for event generation confirmation.

<Processing of the Saving Ratio Calculation Module>

Figure 10:
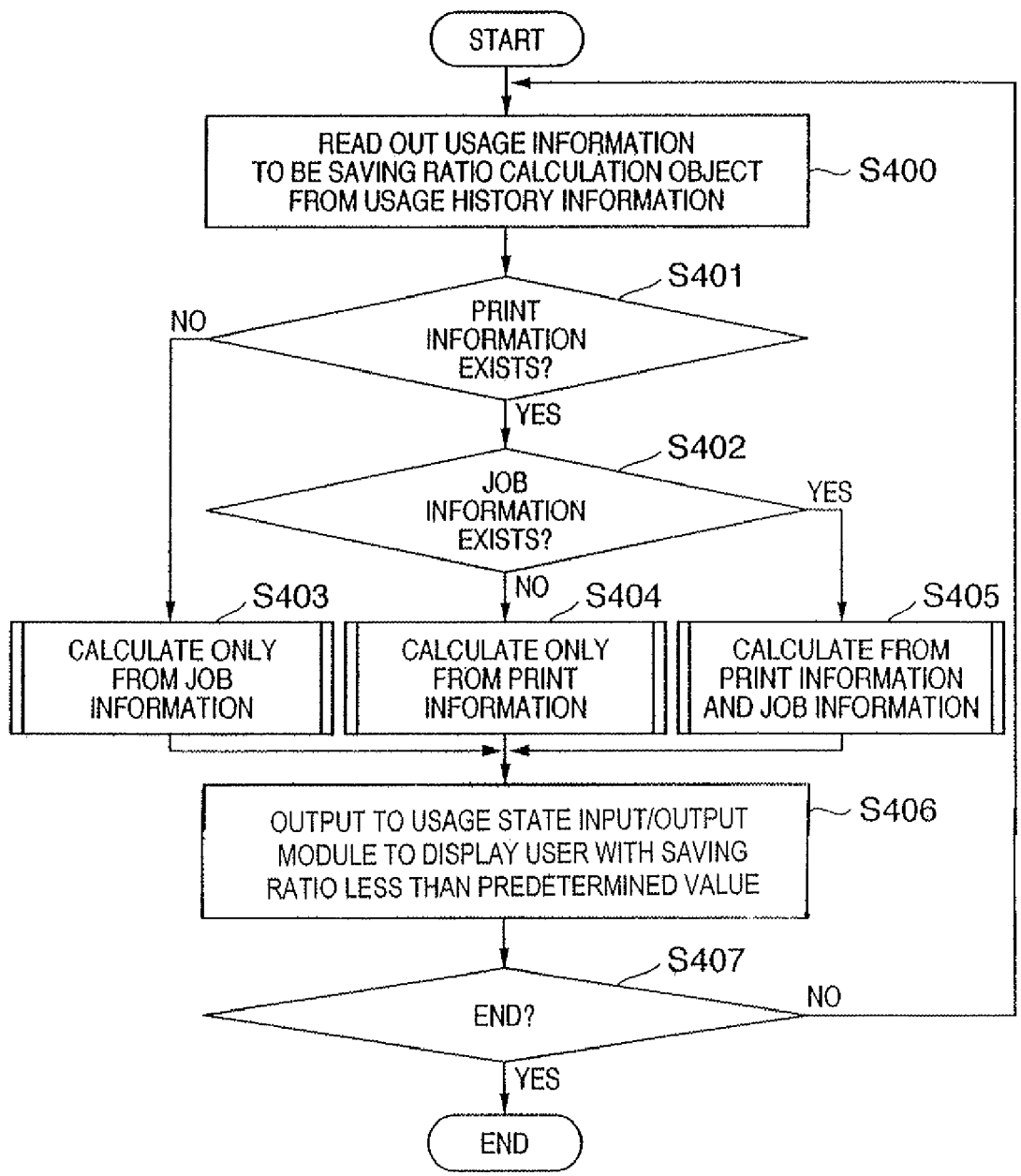
FIG. 10 is a flowchart showing processing for calculating a saving ratio of the job account system.

Processing for calculating a saving ratio to be performed by the saving ratio calculation module 1031e will be described with reference to a flowchart of FIG. 10.

First, in step S400, the saving ratio calculation module 1031e reads out one piece of usage information, which becomes an object of saving ratio calculation, from the usage history information 1032c of the database 1032. In step S401, the saving ratio calculation module 1031e judges whether or not the usage information includes a print history acquired from the apparatus. If the usage information does not include the print history, sine the usage information is usage information including only job information acquired by the client computers 1010 and 1020, in step S403, the saving ratio calculation module 1031e calculates a saving ratio according to only the job information.

If it is judged in step S401 that the print information is included, the saving ratio calculation module 1031e proceeds to step S402 and judges whether or not the job information acquired by the client computers 1010 and 1020 is included in the usage information.

If the job information is not included, the saving ratio calculation module 1031e proceeds to step S404 and calculates a saving ratio according to only the print information acquired from the apparatus.

If the job information is included, in step S405, the saving ratio calculation module 1031e calculates a saving ratio according to both the print information from the apparatus and the job information from the client computers 1010 and 1020.

When the calculation of the saving ratio ends, in step S406, the saving ratio calculation module 1031e outputs the saving ratio to the database 1032 or the usage state input/output module 1031d.

Then, in step S407, the saving ratio calculation module 1031e judges whether or not the calculation processing has been finished for all pieces of usage information to be objects of the saving ratio calculation. If the calculation processing has not been finished, the saving ratio calculation module 1031e returns to step S400. If the calculation processing has been finished, the saving ratio calculation module 1031e ends the processing of FIG. 10.

Note that the saving ratio calculation module 1031e may calculate a saving ratio in advance and store the saving ratio as a part of usage history information or may calculate a saving ratio on the basis of stored usage history information in response to an output request for a saving ratio from the user and output the saving ratio using the usage state input/output module 1031d.

(Saving Ratio Calculation from Job Information)

Figure 11:
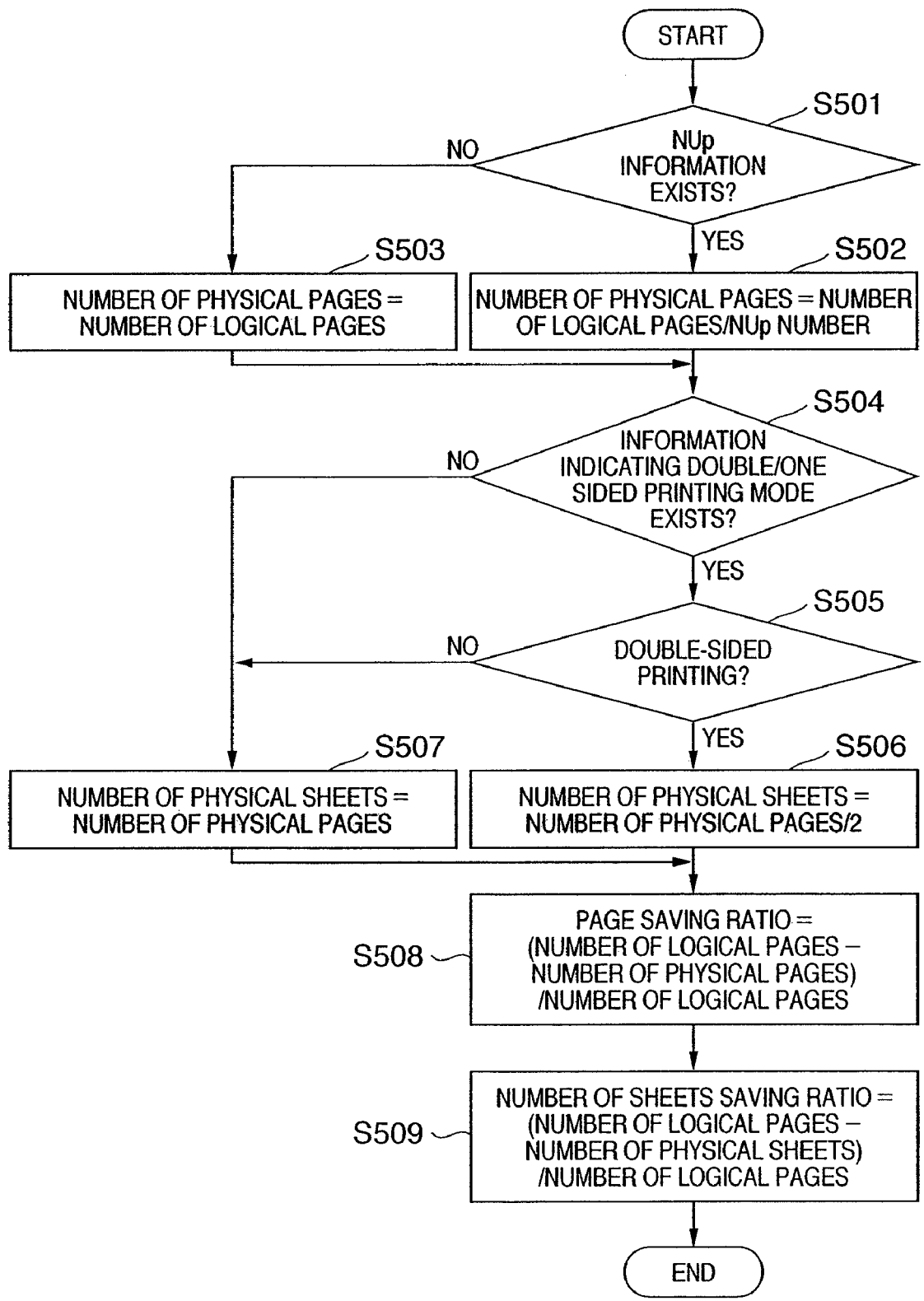
FIG. 11 is a flowchart showing processing for calculating a saving ratio of the job account system.

Next, saving ratio calculation processing, which is performed in step s403, will be described with reference to FIG. 11. FIG. 11 is a flowchart showing processing for calculating a saving ratio only from job information. It is assumed that this job information includes at least information on the number of logical pages.

In step S501, the saving ratio calculation module 1031e judges whether or not page layout information (information of contents for laying out the Nup number of logical pages in one physical page) is included in the job information. If the page layout information is included, in step S502, the saving ratio calculation module 1031e divides the number of logical pages in the job information with the Nup number to thereby calculate the number of physical pages which seems to be actually outputted. If it is judged in step S501 that the page layout information is not included, in step S503, the saving ratio calculation module 1031e regards the number of logical pages as the number of physical pages.

In step S504, the saving ratio calculation module 1031e judges whether or not double-sided printing/one-side printing information is included in the job information. If the double-sided printing/one-side printing information is included, in step S505, the saving ratio calculation module 1031e judges whether the job is a job for performing double-sided printing. If the job is the job for performing double-sided printing, in step S506, the saving ratio calculation module 1031e divides the number of physical pages by two to thereby calculate the number of physical sheets. If the double-sided printing/one-side printing information is not included, or if the job is not for double-sided printing, the saving ratio calculation module 1031e regards the number of physical pages as the number of physical sheets.

Then, in step S508, the saving ratio calculation module 1031e substitutes the number of logical pages, the number of physical pages, and the number of physical sheets calculated in the above-described processing in the expression [page saving ratio=(number of logical pages−number of physical pages)/number of logical pages], whereby a page saving ratio is calculated. In addition, in step S509, the saving ratio calculation module 1031e substitutes the number of logical pages, the number of physical pages, and the number of physical sheets calculated in the above-described processing in the expression [number of sheets saving ratio=(number of logical pages−number of logical sheets)/number of logical pages], whereby a number of sheets saving ratio is calculated.

(Saving Ratio Calculation from Print Information)

Figure 12:
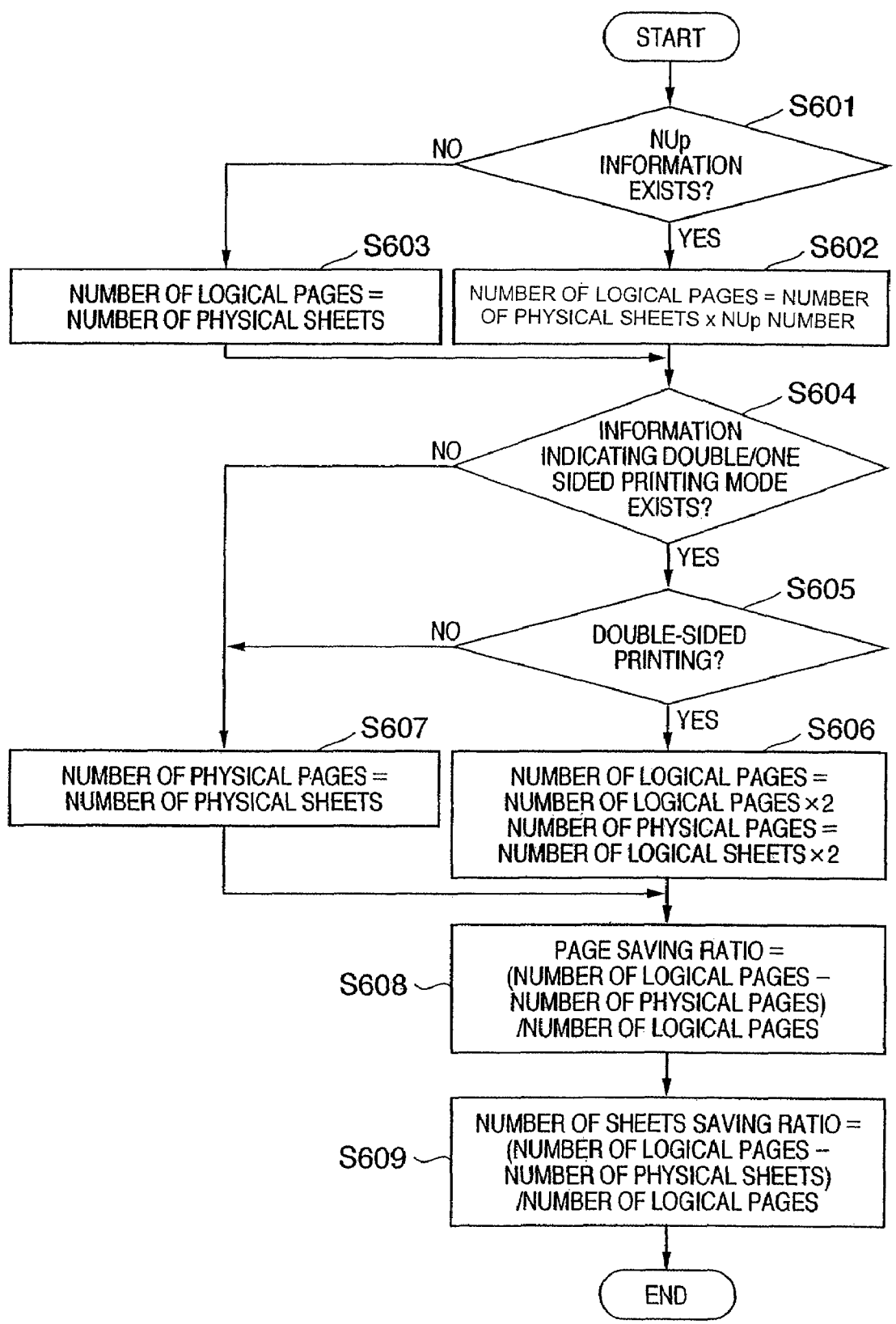
FIG. 12 is a flowchart showing processing for calculating a saving ratio of the job account system.

Next, processing for saving ratio calculation, which is performed in step S404, will be described with reference to FIG. 12. FIG. 12 is a flowchart showing processing for calculating a saving ratio only from print information. Here, it is assumed that at least the number of physical sheets is included in the print information.

In step S601, the saving ratio calculation module 1031e judges whether or not page layout information (Nup) is included in the print information. If the page layout information is included, in step S602, the saving ratio calculation module 1031e multiplies the number of physical pages in the print information by the Nup number to thereby calculate the number of logical pages which seems to be requested by an application. If it is judges in step S601 that the page layout information is not included, in step S603, the saving ratio calculation module 1031e regards the number of physical pages as the number of logical pages.

In step S604, the saving ratio calculation module 1031e judges whether or not double-sided printing/one-side printing information exists in the print information. If the double-sided printing/one-side printing information exists, in step S605, the saving ratio calculation module 1031e judges whether or double-sided printing has been performed. If the double-sided printing has been performed, in step S606, the saving ratio calculation module 1031e further multiplexes the number of logical pages calculated by the above-described processing by two to thereby calculate the number of logical pages. In addition, the saving ratio calculation module 1031e calculates the number of physical pages by multiplying the number of physical sheets by two. If the information indicating double/one sided printing mode does not exist, or if the double-sided printing has not been performed, in step S607, the saving ratio calculation module 1031e regards the number of physical sheets as the number of physical pages directly.

Then, in step S608, the saving ratio calculation module 1031e substitutes the number of logical pages, the number of physical pages, and the number of physical sheets calculated in the above-described processing in the expression [page saving ratio=(number of logical pages−number of physical pages)/number of logical pages] to thereby calculate a page saving ratio. In addition, in step S609, the saving ratio calculation module 1031e substitutes the number of logical pages, the number of physical pages, and the number of physical sheets calculated in the above-described processing in the expression [number of sheets saving ratio=(number of logical pages−number of logical sheets)/number of logical pages] to thereby calculate a number of sheets saving ratio.

Note that in the case in which the number of physical pages is included in the print information, it is sufficient to substitute the number of physical pages for the number of logical pages in step S603, and substitute the number of physical pages× Nup number for the number of logical pages in step S602. In this case, the processing of steps S604 to S607 is unnecessary.

(Saving Ratio Calculation from Job Information and Print Information)

Figure 13:
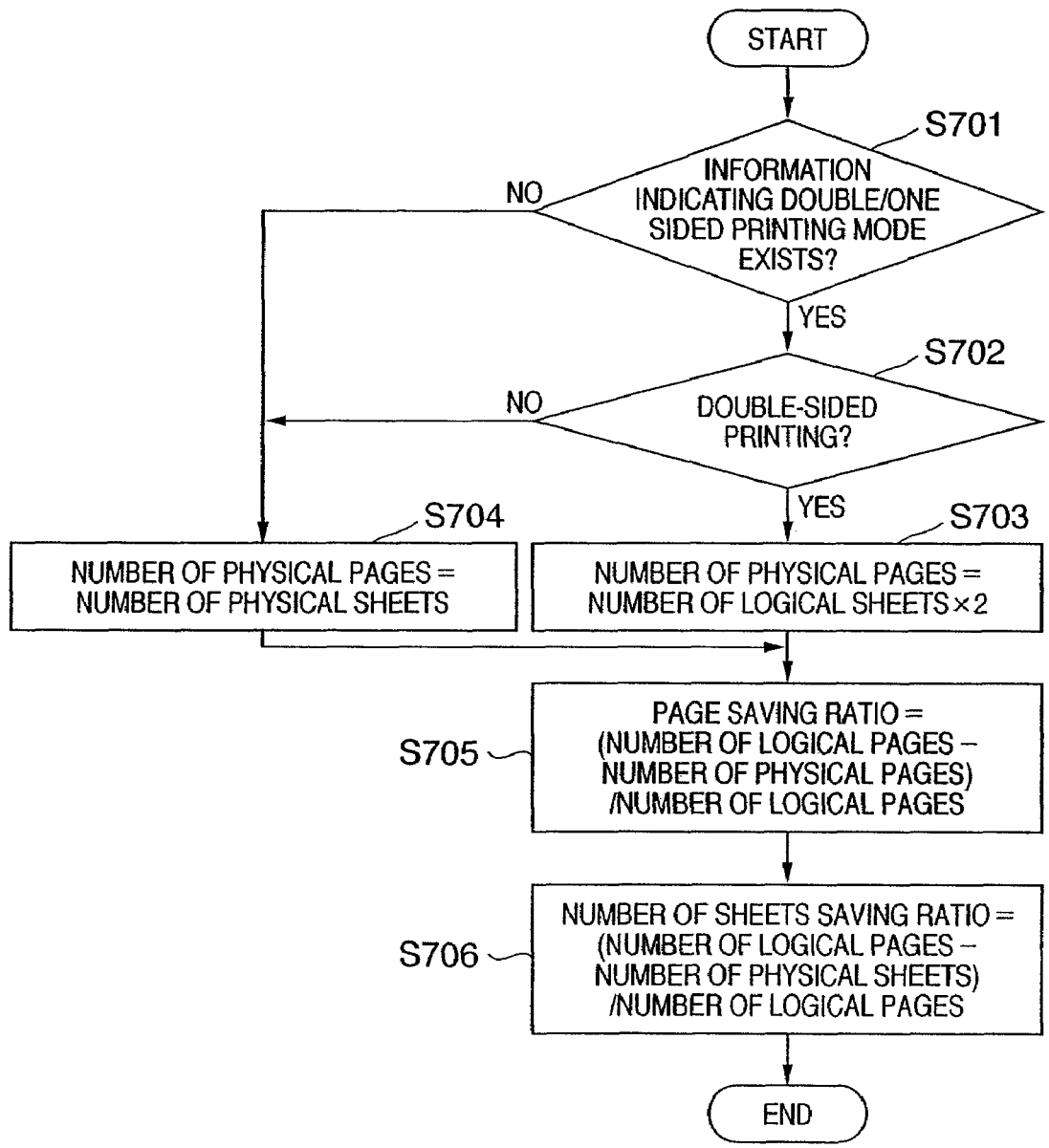
FIG. 13 is a flowchart showing processing for calculating a saving ratio of the job account system.

Next, processing for saving ratio calculation, which is performed in step S405, will be described with reference to FIG. 13. FIG. 13 is a flowchart showing processing for calculating a saving ratio from job information and print information. Here, it is assumed that at least the number of physical sheets is included in the print information.

In step S701, the saving ratio calculation module 1031e judges whether or not double-sided printing/one-side printing information exists in the print information. If the double-sided printing/one-side printing exists, in step S702, the saving ratio calculation module 1031e judges whether or not double-sided printing has been performed. If the double-sided printing has been performed, in step S703, the saving ratio calculation module 1031e multiplies the number of physical sheets by two to thereby calculate the number of physical pages. If the double-sided printing/one-side printing information does not exist, or if the double-sided printing has not been performed, in step S704, the saving ratio calculation module 1031e regards the number of physical sheets as the number of physical pages directly.

Then, in step S705, the saving ratio calculation module 1031e substitutes the number of logical pages, the number of physical pages, and the number of physical sheets calculated in the above-described processing in the expression [page saving ratio=(number of logical pages−number of physical pages)/number of logical pages] to thereby calculate a page saving ratio. In addition, in step S706, the saving ratio calculation module 1031e substitutes the number of logical pages, the number of physical pages, and the number of physical sheets calculated in the above-described processing in the expression [number of sheets saving ratio=(number of logical pages−number of logical sheets)/number of logical pages] to thereby calculate a number of sheets saving ratio.

Note that, in the case in which both the number of physical sheets and the number of physical pages are included in the print information, the processing of steps S701 to S704 are unnecessary.

According to the above-described embodiment, it is possible to acquire not only the number of logical pages but also information relating to saving such as a page layout and double-sided printing from the job information to increase a saving ratio.

In addition, even in an environment in which such information cannot be acquired at the time of print request, it is possible to acquire the actual number of outputted sheets from the apparatus and acquire information relating to saving such as a page layout and double-sided printing included in the print information from the apparatus to calculate a saving ratio.

Further, even in the case in which information relating to saving such as a page layout and double-sided printing cannot be acquired, it is possible to acquire the number of logical pages from the client computer and acquire the number of outputted pages and the number of sheets from the apparatus, and uses the number of logical pages, the number of outputted pages, and the number of sheets to thereby calculate a saving ratio.

Moreover, it is possible to judge presence or absence of these pieces of information and automatically switch a calculation method of a saving ratio to thereby calculate a saving ratio efficiently in any environment or apparatus.

Other Embodiments

The embodiment of the present invention has been described in detail. The present invention may be applied to a system comprising plural apparatuses or may be applied to an apparatus comprising one device.

In addition, although a saving ratio is calculated as usage efficiency information in the above description, usage efficiency may be indicated by other numerical values. For example, it is also possible to calculate a page usage ratio according to [page usage ratio=number of physical pages/number of logical pages], calculate a number of sheets usage ratio according to [number of sheets usage ratio=number of physical sheets/number of logical pages], and output these usage ratios as the usage ratio information. Further, it is also possible to simply calculate the reduced number of pages according to [reduced number of pages=number of logical pages−number of physical pages], calculate reduced number of sheets according to [reduced number of sheets=number of logical pages−number of physical pages], and output these reduced numbers as the usage efficiency information.

Note that the present invention also includes a case in which the present invention is attained by supplying a program of software realizing the function of the above-described embodiment to a system or an apparatus directly or from a distant location, and a computer of the system or the apparatus reading out to execute a supplied program code. In that case, a form the software needs not be the program as long as it has a function of the program.

Therefore, a program code itself to be installed in a computer in order to realize the functional processing of the present invention with the computer also realizes the present invention. That is, the present invention includes a computer program itself for realizing the functional processing of the present invention.

In that case, the program may be in any form such as an object code, a program to be executed by an interpreter, a script data to be supplied to an OS, or the like as long as it has a function of the program.

As a recording medium for supplying a program, for example, there are a floppy (registered trademark) disk, a hard disk, an optical disk, a magneto-optical disk, an MO, a CD-ROM, a CD-R, a CD-RW, a magnetic tape, a nonvolatile memory card, a ROM, and a DVD (DVD-ROM, DVD-R).

Besides, a program can also be supplied by making connection to a web page on the Internet using a browser of a client computer and downloading a computer program itself of the present invention or a file, which is compressed and includes an automatic installation function, to a recording medium such as a hard disk from the web page. In addition, the functional processing of the present invention can also be realized by dividing a program code constituting a program of the present invention into plural files and downloading the respective files from different web pages. That is, a WWW server, which downloads a program file for realizing the functional processing of the present invention with a computer to plural users, is also included in the present invention.

In addition, the functional processing of the present invention can also be realized by encrypting the program of the present invention and store the program in a storage medium such as a CD-ROM to distribute it to users, causing users who has cleared predetermined conditions to down load key information solving the encryption from the web page via the Internet, and executing the encrypted program by using the key information to cause the computer to install the program.

Further, the function of the embodiment can be realized by a computer executing a read out program. Besides, an OS or the like running on the computer performs a part or all of actual processing on the basis of an instruction of the program, and the function of the embodiment can be realized by the processing.

Moreover, a program read out from a recording medium is written in a memory provided in a function extended board inserted in a computer or a function extended unit connected to the computer, and then, a CPU or the like provided in the function extended board or the function extended unit performs a part or all of actual processing on the basis of an instruction of the program, and the function of the embodiment is realized by the processing.

According to the above-described embodiments, it becomes possible to grasp a usage ratio of an image forming apparatus. There is an effect that understanding for resource saving and energy saving is improved by managing a system on the basis of this information, and an efficient apparatus using environment can be realized.

As many apparently widely different embodiments of the present invention can be made without departing from the spirit and scope thereof, it is to be understood that the invention is not limited to the specific embodiments thereof except as defined in the appended claims.

The invention claimed is:

1. A system for managing print information related to a plurality of jobs executed by an image forming apparatus included in the system, the system comprising:
   a calculator that calculates a usage efficiency for each of a plurality of users who are identified by user information included in the print information, based on a number of physical sheets printed for the plurality of jobs and a number of logical pages printed for the plurality of jobs; and
   a controller that performs a control to (i) display a list of information of the plurality of users together with the usage efficiency calculated by the calculator and (ii) output a usage state report, which is calculated for each operation mode or type of sheet, indicating a usage fee for each of the plurality of users, wherein the usage efficiency includes a saving ratio, and information of a user corresponding to the saving ratio that is less than the predetermined value in the plurality of users is displayed in the list so as to be distinguished from information of a user corresponding to the saving ratio that is not less than the predetermined value in the plurality of users.

2. A system according to claim 1, wherein the usage efficiency is calculated by subtracting the number of physical sheets from the number of logical pages to obtain a difference and further dividing the difference by the number of logical pages.

3. A system according to claim 1, wherein the print information includes layout information representing a number of logical pages included in a single physical sheet.

4. A method for managing print information related to a plurality of jobs executed by an image forming apparatus, the method comprising the steps of:
   calculating a usage efficiency for each of a plurality of users who are identified by user information included in the print information, based on a number of physical sheets printed for the plurality of jobs and a number of logical pages printed for the plurality of jobs, and
   performing a control to (i) display a list of information of the plurality of users together with the usage efficiency calculated in the calculating step and (ii) output a usage state report, which is calculated for each operation mode or type of sheet, indicating a usage fee for each of the plurality of users, wherein the usage efficiency includes a saving ratio and predetermined value in the plurality of users is displayed in the list so as to be distinguished from information of a user corresponding to the saving ratio that is not less than the predetermined value in the plurality of users.

5. A computer-readable medium storing a computer program for a method for managing print information related to a plurality of jobs executed by an image forming apparatus, the program causing a computer to:
   calculate a usage efficiency for each of a plurality of users who are identified by user information included in the print information, based on a number of physical sheets printed for the plurality of jobs and a number of logical pages printed for the plurality of jobs, wherein the usage efficiency including a saving ratio is calculated by subtracting the number of physical sheets from the number of logical pages to obtain a difference and further dividing the difference by the number of logical pages, and
   perform a control to (i) display a list of information of the plurality of users together with the calculated usage efficiency and (ii) output a usage state report, which is calculated for each operation mode or type of sheet, indicating a usage fee for each of the plurality of users, wherein information of a user corresponding to the saving ratio that is less than the predetermined value is displayed in the list so as to be distinguished from information of a user corresponding to the saving ratio that is not less than the predetermined value in the plurality of users.

* * * * *